Figure 1:
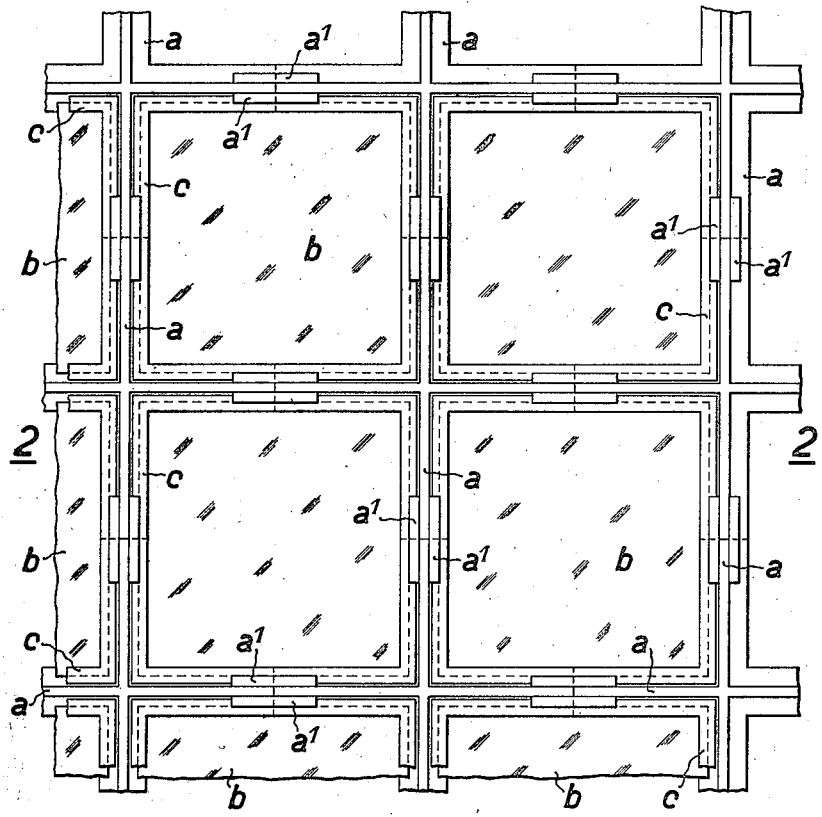

Patented May 15, 1923.

1,454,945

UNITED STATES PATENT OFFICE.

PAUL LUDWIG PFANNENSCHMIDT, OF JENA, GERMANY.

ACID RECEIVER.

Application filed August 8, 1921. Serial No. 490,733.

(GRANTED UNDER THE PROVISIONS OF THE ACT OF MARCH 3, 1921, 41 STAT. L., 1313.)

*To all whom it may concern:*

Be it known that I, PAUL LUDWIG PFANNENSCHMIDT, a citizen of the German Republic and residing at Jena, Germany, have invented a new and useful Acid Receiver (for which I have filed application in Germany, July 31, 1919, and Sept. 8, 1919; England, July 30, 1920, and Sept. 6, 1920; France, July 30, 1920, Patent 521,581; Austria, July 30, 1920; Poland, July 31, 1920; Czechoslovakia, July 28, 1920), of which the following is a specification.

In the manufacture of sulphuric acid, chambers and towers constructed in lead have hitherto exclusively been used, which, as is known, on account of the high specific gravity and the moderate hardness of lead cause a lot of unpleasantness and difficulties in the working. Various attempts have been made to overcome these difficulties, however, up to the present no material of more favorable properties has been found as a substitute for lead. In a similar manner the reaction chambers, acid mains, etc. used in the production of hydrochloric acid and nitric acid had almost exclusively to be made of materials such as stone, stoneware, chamotte, etc., which on account of their moderate strength and other properties in connection therewith also entail a number of disadvantages.

The invention proposes to obviate these disadvantages by replacing the old manner of construction, i. e. the building of the walls of such reaction chambers of a uniform material, by a new construction which permits the use of more suitable materials. This new way of construction consists in building the walls of the reaction chambers in form of a window-shaped framework, rigid in itself and consisting of acid-proof material, in the openings of which framework comparatively thin, acid-proof plates are inserted. A framework of this kind may without difficulty be made firmer and stronger than the lead or stone chambers hitherto used, whilst its weight is substantially reduced. The plants under consideration may in consequence of their substantially reduced weight be arranged so as to be easier overlooked, the foundation and supports also become lighter, and the whole plant therefore cheaper. The simplest arrangement of the framework results from the provision of rectangular, or square openings, however, this does not prevent the adoption of other forms also in a given case. For the framework such material should be used as possesses great stability, and is either in itself proof against the acids in question, as for instance neutral iron, aluminium (for hydrochloric acid plants), or is made acid-proof by a suitable coating, as for instance enamelled, or lead-coated iron. The stability of a framework of the said kind, which in case of necessity may conveniently be still increased by suitable struts, renders a further stiffening against the surrounding building, or a special encasing of the reaction spaces superfluous, and results for instance in the case of sulphuric acid chambers in the form of a rigid bell, which may be suspended in a simple manner.

The plates which are to fill the openings of the framework may be made of various materials, which are the more favorable the thinner and thereby lighter the plates can be made, taking into account their requisite strength. A particular advantage is derived from the invention when placing into the frame openings plates made of quartz glass. The latter possesses, as is known, a number of properties which render it in an excellent manner suitable for such purposes. Since the present resources permit the manufacture of very thin plates of quartz glass of comparatively large dimensions, quartz glass becomes a material for acid chambers, etc., which especially on account of its low specific gravity, its acid resisting quality, and its immunity against sudden changes of temperature, is far superior to the materials hitherto used, i. e. lead, stone, fire-clay, etc. Instead of quartz glass, any other thin plates may be used as well, for instance glass plates, enamelled metal plates, etc. For fastening the plates to the framework, auxiliary frames are suitably used which support the plates all-round and are fastened to the principal frame in any suitable manner. The clearing spaces between the plates and the framework may be filled out with some kind of acid-proof putty, for instance water glass putty in case the plates are made of quartz glass. When a plate gets broken somehow, it may without trouble be replaced by a fresh plate without much loss of time. This does away with the tedious way of soldering lead walls which takes up much time. When using quartz glass plates, the additional advantage is derived, that any damaged part may be mended by simply sticking a piece of quartz glass over it with the aid of water glass putty.

In order that the framework may easily and speedily be repaired, should it have become damaged, it is recommended to build up the framework of cross-shaped parts which are jointed by fish-plates. In case of necessity each separate part of the frame may then be taken out and replaced by a fresh one without affecting the remaining parts of the framework. Thereby either for each separate opening a subdivided frame correspondingly jointed by fish-plates may be provided, or the arrangement may be so made that in each case the framework for several openings may be taken out jointly. In order to ensure that the butting places fit tightly, the connecting fish-plates may for instance be provided with small recesses, which permit of having the clearing spaces filled out with lead or the like.

The invention is not restricted to acid chambers and towers proper, but may also be applied in any other case where hollow spaces are concerned which are filled with, or serve for conducting acid gases or acid vapours. In particular tube mains may be made after the manner of construction according to the invention, especially since, when conducting acid gases, etc., a cooling effect will frequently be intended, whereby, with a view to obtaining the desired effect, the simpler rectangular cross-section provided for the present framework is more favourable than the circular cross-section.

Whenever applying the invention, it has to be taken into account that the respective material for the framework and for the inserted plates is not affected by the respective acids used.

Since quartz glass is entirely proof against most acids, by using plates of this material the great advantage is derived that products of a considerably purer state may be manufactured than was hitherto the case. Besides, as is known, even at higher temperatures quartz glass permits of having the walls cooled by cooling water, if this becomes necessary. Furthermore, for various chemical processes the use of quartz glass affords the possibility of an increased production. This applies particularly to the high intensity sulphuric acid process, of which as particularly characteristic examples the Griesheim method and Opl's tower method may be mentioned, in both of which the high nitrosity of the gas mixture affects the lead walls of the towers considerably, which drawback is not inherent in quartz glass walls.

If the plates forming the walls consist of quartz glass, or any other glasslike material, a somewhat different construction may be used. Plates of such materials can without difficulty be made with reinforced edges, in which manner these plates are given a considerably greater strength as compared with plane plates, and they do no longer require to be supported on their entire circumference. The invention consists in this, that instead of placing each plate into a separate frame so as to be supported all-round, the plates are now provided with a reinforced edge, in which they are directly contiguous to each other, and they are arranged in such a way that the side of the walls which faces the acid-filled space uniformly consists of quartz glass, or the material which may be used instead and that the requisite framework onto which the plates have to be fixed in a suitable manner comes to lie outside the acid-filled space. By the said arrangement a simpler and cheaper construction of the framework is ensured without losing any of the advantages hitherto gained, since the framework need henceforth not be made of acid-proof material, and simply has to serve as a carrier of the plates. The interconnection of the separate plates and their connection with the framework may thereby be effected in any desired manner. A simple way of connecting is obtained by providing at each plate corner a screw-connection passing through the plate, which at the same time forms a junction with the framework. When using larger plates, it may become necessary, besides connecting the separate plates at the corners, to also connect them in other places, either one with another or with the framework. The plates may be fastened in such a manner that the separate plates, on breaking, may be replaced by others with ease. If for this purpose the reinforced part of the plate be formed after the manner of a flange, the interconnection of the plates and their connection with the framework may, in addition, be exclusively made at the outside, in which manner all parts projecting into the acid-filled space are avoided. Again, under certain circumstances it may be found suitable that the separate plates with their adjoining flanges slightly overlap each other to ensure a tighter joint. However, generally it will suffice to fill the clearing spaces between the adjoining plates by some kind of putty.

Figure 2:
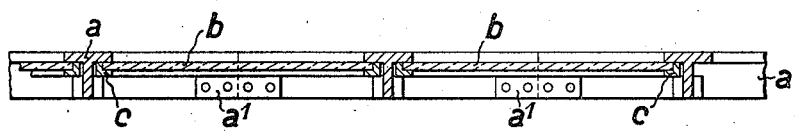
Figures 3, 4:
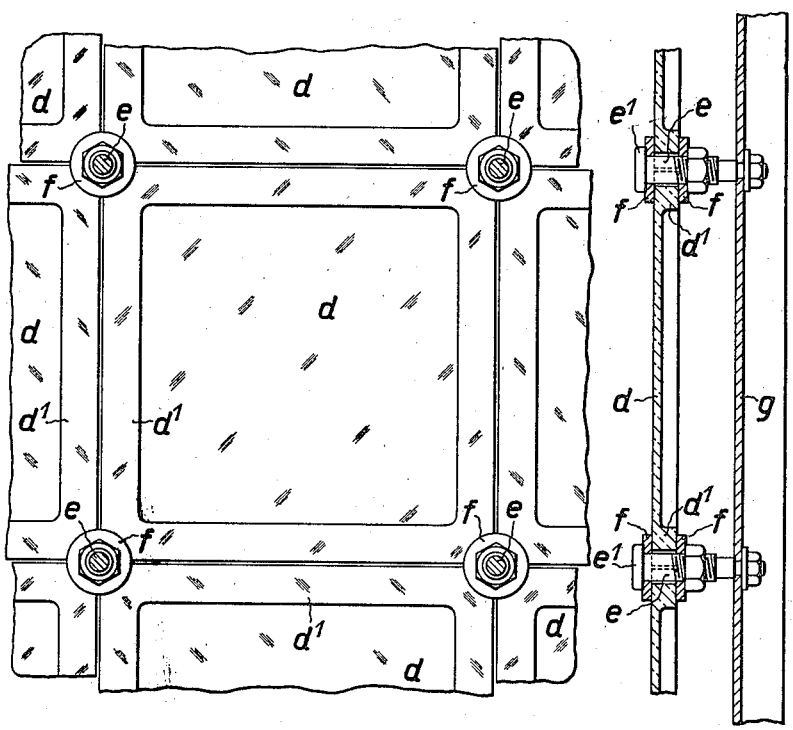

In the annexed drawing Figs. 1 and 2, on the one hand, and Figs. 3 and 4, on the other hand, show a constructional example each of the invention.

Figs. 1 and 2 show a part of the wall of an acid chamber according to the new construction, in which the frame openings are square. Fig. 1 is a view, Fig. 2 a horizontal section. The framework embodying the skeleton of the wall is formed by cross-shaped parts $a$, which are made of enamelled iron having a T-shaped cross-section and are interconnected by fish-plates $a^1$. In the openings of the framework there are plates $b$ of quartz glass inserted, which are supported all-round by auxiliary frames $c$. The auxiliary frames $c$ are on their part secured in position by the fish-plates $a^1$. Figs. 3 and 4 illustrate as a second constructional example a part of the wall of an acid-chamber, formed by square plates, which butt against each other. Fig. 3 is a view of the wall from outside after the framework has been cut away, Fig. 4 is a vertical section through the wall.

The wall proper consists of plates $d$ made of quartz glass, which plates have a reinforced edge $d^1$ all-round, and are directly continuous to each other. The butt joints are to be supposed to be filled out with some kind of putty. At each plate corner is a screw-bolt $e$, which passes through the wall and which interconnects the four adjoining plates $d$ at their corners, whereby in each case two lead washers $f$ are interposed, the screw-bolt itself being fixed to the framework, which latter is indicated by a U-iron $g$. The head $e^1$ of the bolt $e$ being inside the acid chamber is provided with an acid-proof enamel coating.

I claim:

1. In an acid receiver a window-shaped framework, rigid in itself and made of acid-proof material, and comparatively thin, acid-proof plates fastened to the said framework and adapted to cover the openings of the same.

2. In an acid receiver a window-shaped framework, rigid in itself and made of acid-proof material, and comparatively thin, acid-proof plates inserted in the openings of the said framework.

3. In an acid receiver a window-shaped framework, rigid in itself and made of acid-proof material, and comparatively thin plates of quartz glass inserted in the openings of the said framework.

4. In an acid receiver a window-shaped framework being composed of cross-shaped parts, jointed by fish-plates, and made of acid-proof material, and comparatively thin, acid-proof plates inserted in the openings of the said framework.

PAUL LUDWIG PFANNENSCHMIDT.